Figure 1:
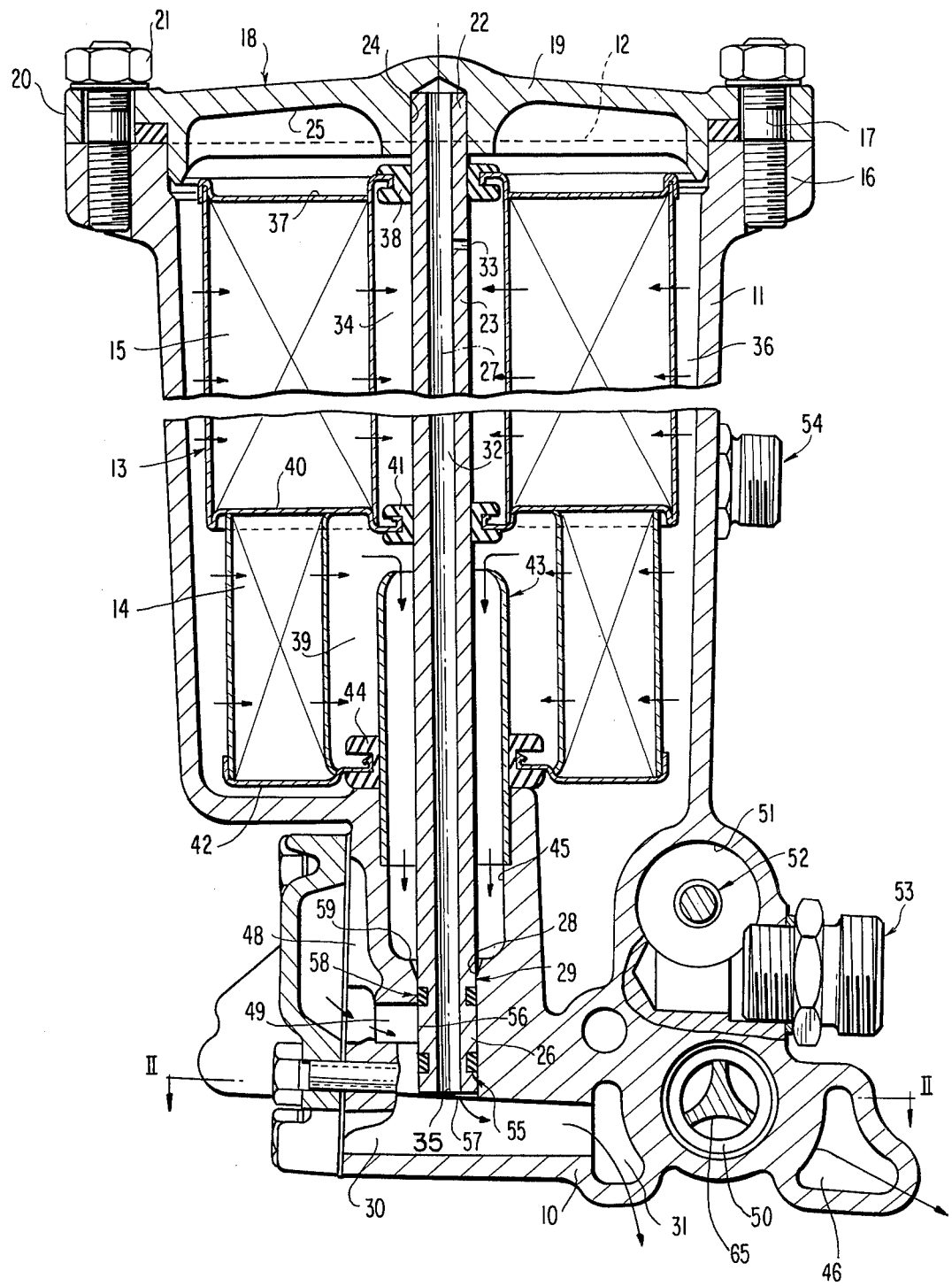

United States Patent [19]
Conrad

[11] 4,094,791
[45] June 13, 1978

[54] LUBRICATING OIL FILTER WITH AN UPRIGHT FILTER POT

[75] Inventor: Ulrich Conrad, Ludwigsburg, Germany

[73] Assignee: Daimler-Benz Aktiengesellschaft, Germany

[21] Appl. No.: 744,309

[22] Filed: Nov. 23, 1976

[30] Foreign Application Priority Data

Nov. 27, 1975 Germany .............................. 2553293

[51] Int. Cl.[2] ............................................ B01D 27/08
[52] U.S. Cl. ........................... 210/316; 210/DIG. 13; 210/443
[58] Field of Search ............... 210/168, 130, 240, 314, 210/315, 316, 339, 433, 434, 439, 443, DIG. 13

[56] References Cited

U.S. PATENT DOCUMENTS

| | | | |
|---|---|---|---|
| 2,406,308 | 8/1946 | Vokes et al. | 210/316 X |
| 2,507,125 | 5/1950 | Townsend | 210/314 |
| 2,773,602 | 12/1956 | Sylvester | 210/130 X |
| 2,843,268 | 7/1958 | Kennedy | 210/130 X |
| 2,995,253 | 8/1961 | Belgarde et al. | 210/130 X |
| 3,542,199 | 11/1970 | Bray | 210/130 X |

Primary Examiner—Theodore A. Granger
Attorney, Agent, or Firm—Craig & Antonelli

[57] ABSTRACT

A lubricating-oil filter with a filter pot arranged on a filter base, which is provided with an assembly opening adapted to be closed by a cover and in which a filter cartridge is adapted to be inserted by way of the assembly opening; a bolt retained at its upper end at the cover and at its lower end in the filter base is provided with an intermediate channel that connects a filtered-oil chamber of the filter pot with a base channel, itself connected with a filter base connection for the outflow of the filtered-oil; the fastening means for the cover are thereby structurally separate from the bolt and are arranged outside of the bolt axis while the mounting support for the upper end of the bolt is located at the bottom side of the cover and the mounting support for the lower end of the bolt is constructed as slide seat.

13 Claims, 3 Drawing Figures

LUBRICATING OIL FILTER WITH AN UPRIGHT FILTER POT

The present invention relates to a lubricating oil filter with a filter pot arranged upright on a filter base and having an upper assembly opening adapted to be closed with respect to the outside by a cover by the use of detachable fastening means and with at least one filter cartridge arranged within the filter pot and adapted to be inserted or exchanged by way of the assembly opening, whereby a bolt retained at its upper end at the cover and at its lower end at the filter base is provided with an intermediate channel which connects a filter chamber of the filter pot collecting the filtered-oil flow of a filter insert of the filter cartridge, with a base channel, itself connected to a filter base connection for the discharge or outflow of the clean-oil flow from the filter insert.

A lubricating-oil filter of this type corresponds to an internal proposal suggested within the facilities of the assignee of the present application and is characterized in that the bolt represents a line for the discharge or outflow of the clean-oil flow of a filter insert. In this manner, the constructive realization of a second base channel for the separate discharge or outflow of the filterred-oil flow of a second filter insert which is used at the same time with the one filter insert, as well as the connection of the second base channel with the filter chamber in the filter pot, which collects the filtered-oil flow from the second filter insert, is facilitated.

According to the aforementioned previous internal proposal of the lubricating-oil filter, the bolt additionally could be constructed as fastening bolt for the cover. For this purpose, the cover could be provided with a central opening through which extends the bolt thread, whereby the bolt head abutting at the outer surface of the cover is clamped against the filter pot when the lower end of the bolt which is provided with a thread, is screwed into a threaded bore of the filter base. This cover fastening, however, requires a tightening torque for the bolt within very narrow tolerances since the cover which for weight-reasons is relatively thin-walled, could easily deform permanently in case of an excessive torque and would lose its sealing function in case of too low a torque. The central opening of the cover through which extends the bolt requires a separate seal. Finally, with a filter base made of light metal, a separate insert made of a material of higher strength and provided with the threaded bore for the bolt is required.

The task underlying the present invention essentially consists in improving the lubricating-oil filter according to the prior internal proposal for purposes of eliminating the mentioned difficulties.

The underlying problems are solved according to the present invention in that the fastening means of the cover are arranged structurally separated from the bolt and outside of the bolt axis, in that the mounting support for the upper end of the bolt is located at the bottom side of the cover and the mounting support for the lower end of the bolt is constructed as slide fit or slide seat.

In the lubricating-oil filter according to the present invention, the bolt is relieved of the fastening forces of the cover and the slide fit or seat for the mounting support of its lower end in the filter base produces a considerably better seal between the inner space of the filter pot and the base channel connected with the intermediate channel of the bolt. A separate insert is not necessary for the filter base. The cover may have a closed cross section above the assembly opening of the filter pot so that a seal at the cover for the bolt can be dispensed with.

In the lubricating-oil filter according to the prior internal proposal, the lower end of the bolt engages sealingly in a base bore of the filter base, which terminates in the base channel connected to the filter base connection for the discharge or outflow of the filter- or clean-oil flow of the filter insert. An oil discharge channel of the filter base which is in communication with a second filter chamber of the filter pot terminates in the base bore, which is closed off by the lower end of the bolt and by removal of the bolt is brought into free communication with the base channel connected with the intermediate channel and therewith with the associated filter base connection. The purpose of this arrangement is to necessarily empty the filter pot with the opening of the cover during service operations including a change of the filter-cartridge. In order to avoid that the oil content of the filter pot may escape by way of the oil discharge channel in case of relatively long service lives as a result of leakages at the mounting support of the lower end of the bolt, provision is made in the lubricating-oil filter according to the present invention that the slide fit or slide seat is provided with a sealing arrangement effectively interconnected between the discharge orifice of the oil discharge channel in the base bore, on the one hand, and the discharge orifice of the base bore in the base channel, on the other.

Furthermore, in the lubricating-oil filter according to the prior internal proposal, a second oil discharge channel in communication with a third filter chamber of the filter pot terminates in the base bore for the mounting support of the lower end of the bolt, which second oil discharge channel is closed off by the lower end of the bolt and is brought into free communication with the base channel connected with the intermediate channel and therewith with the associated filter base connection by removal of the bolt. With such an arrangement for a lubricating-oil filter operating with a main-flow filter insert and with an auxiliary-flow filter insert, the one oil discharge channel and its filter chamber must necessarily conduct dirty oil since the filtered- or clean-oil flow of the one filter insert is discharged by way of the intermediate channel of the bolt. In order to assure an obsolute separation of clean-oil and dirty-oil also at the mounting support of the lower end of the bolt, which cannot always be assured over longer periods of time with the construction of the mounting support as threaded fastening means, provision is made in the lubricating-oil filter of the present invention that the slide fit or slide seat includes a second sealing arrangement effectively interconnected between the two discharge orifices of the oil discharge channels which are located in the base bore for the mounting support of the lower end of the bolt.

In the lubricating-oil filter according to the prior internal proposal, the filter base is so constructed that the discharge orifice of the base bore for the mounting support of the lower end of the bolt, which is disposed in the base channel in communication with the filter base connection, is offset in the direction of the bolt axis with respect to the discharge orifice of the one oil discharge channel, which is disposed in the base bore.

In adaptation to such a base construction, the arrangement is made in the lubricating oil filter according to the present invention in such a manner that the sliding fit or sliding seat includes a reduced section located within the area of the two discharge orifices offset with respect to one another in the direction of the bolt axis and the sealing arrangement effectively interconnected between these discharge orifices is located at the reduced section. In this manner, the sealing arrangement disposed at the reduced section is protected against damages during the insertion of the lower end of the bolt into the sliding fit or slide seat.

The area of the cover located above the assembly opening is completely relieved of clamping forces of the cover fastening arrangement in the lubricating oil filter according to the present invention in that the fastening means of the cover are arranged at the cover rim.

Finally, the mounting support for the upper end of the bolt of the lubricating-oil filter according to the present invention is simplified in an advantageous manner in that the upper end of the bolt is immovably inserted into an aperture of the cover.

Accordingly, it is an object of the present invention to provide a lubricating oil filter with an upright filter pot which avoids by simple means the aforementioned shortcomings and drawbacks encountered heretofore.

Another object of the present invention resides in a lubricating oil filter in which the tightening torque for the bolt fastening the removable cover to the filter pot does not have to be kept within narrow tolerances.

A further object of the present invention resides in a lubricating oil filter of the type described above in which the danger of permanent deformation of the cover or inadequate sealing due to improper tightening of the tightening bolt is far-reachingly minimized.

Still another object of the present invention resides in a lubricating oil filter of the type described above which simplifies the sealing arrangement required, especially with respect to the bolt, while obviating costly manufacturing steps, particularly with the use of light-weight metal for the various parts of the housing.

Another object of the present invention resides in a lubricating oil filter with a removable cover in which the central bolt is relieved of the fastening forces of the cover.

Still another object of the present invention resides in a lubricating oil filter of the type described above in which a central bolt provides an intermediate channel, yet an improved seal is assured between the interior space of the filter pot and the base channel connected with the intermediate channel formed by the bolt.

A further object of the present invention resides in a lubricating oil filter in which a separate seal for the central bolt can be dispensed with.

Still another object of the present invention resides in a lubricating oil filter which not only assures improved reliability in operation but also facilitates service thereof.

Figure 2:
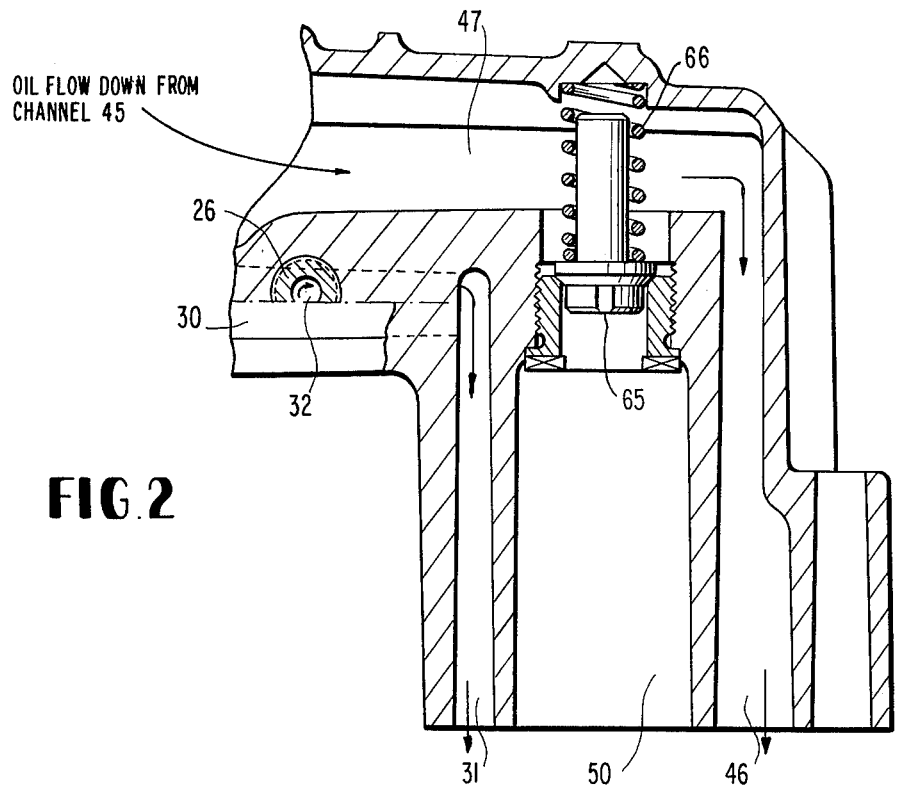
Figure 3:
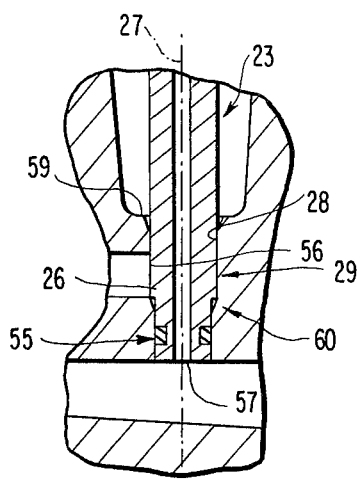

These and other objects, features and advantages of the present invention will become more apparent from the following description when taken in conjunction with the accompanying drawing which shows, for purposes of illustration only, two embodiments in accordance with the present invention, and wherein:

FIG. 1 is an axial cross-sectional view through a lubricating oil filter in accordance with the present invention, with the cross-sectional plane containing the bolt axis;

FIG. 2 is a cross-sectional view through the filter base of the lubricating oil filter, taken along line II—II in FIG. 1; and FIG. 3 is a partial cross-sectional view, corresponding to FIG. 1, through a modified embodiment of the mounting support for the lower end of the bolt of the lubricating oil filter in accordance with the present invention which, as to the rest of the construction, is identical with that of the embodiment of FIGS. 1 and 2.

Referring now to the drawing wherein like reference numerals are used throughout the various views to designate like parts, and more particularly to FIGS. 1 and 2, a filter base 10 is constructed in one piece with a filter pot 11 which in the installed position is upright or vertical. A filter cartridge generally designated by reference numeral 13 with a main-flow filter insert 14 and with an auxiliary flow filter insert 15 is inserted into the filter pot 11 by way of the upper assembly opening 12 thereof. The upper end of the filter pot 11 is constructed as fastening flange 16 with screwed-in studs or stay bolts 17, which serves for the detachable fastening of a cover generally designated by reference numeral 18 which closes the assembly opening 12 in a fluid-tight manner. The cover 18 has a closed cross section over the area of the assembly opening 12 and a cover flange 20 along its edge. The cover flange 20 is clamped against the fastening flange 16 by means of nuts 21 screwed on the studs 17.

The upper end 22 of a tubularly shaped bolt 23 which extends with play through the annularly shaped filter cartridge 13 is immovably inserted into an aperture 24 provided at the bottom side 25 of the cover 18. The lower end 26 of the bolt 23 is displaceably guided in a base bore 28 of the filter base 10 which is coaxial to the bolt axis 27, so that the two parts 26 and 28 form a sliding fit or slide seat generally designated by reference numeral 29 as lower mounting support for the bolt 23. At its lower end, the housing bore 28 terminates in a base channel 30, which is in communication with a filter base connection 31 for the outflow or discharge of the filtered- or clean-oil flow of the auxiliary-flow filter insert 15. The central bore of the bolt 23 forms an intermediate channel 32 which is connected by way of an upper radial bore 33 in the bolt 23 with an annularly shaped filter chamber 34 and connects the latter by way of its lower end face opening 35 with the base channel 30. The filter chamber 34 receives the filtered- or clean-oil which flows radially inwardly out of the auxiliary-flow filter insert 15 and is sealed off with respect to a filter chamber 36 carrying the dirty oil by the upper cover disk 37 of the filter cartridge 13 and by an annular seal 38 mounted over the bolt 23 and cooperating with the upper cover disk 37. The filter chamber 34 is partitioned off with respect to a further filter chamber 39 which receives the filtered- or clean-oil leaving the main flow filter insert 14 in the radially inward direction, by a partition disk 40 of the filter cartridge 13 and by an annular seal 41 mounted over the bolt 23 and cooperating with the partition disk 40. The partition disk member 40 partitions off the main-flow filter insert 14 with respect to the auxiliary-flow filter insert 15 in a fluid-tight manner. The filter chamber 39 carrying filtered- or clean-oil is sealed off with respect to the filter chamber 36 carrying the dirty oil by a bottom disk 42 of the filter cartridge 13 as well as by annular seal 44 mounted on a standpipe or vertical tubular member generally designated by reference numeral 43 and cooperating with the bottom disk member 42. The tubular member 43 is thereby immovably inserted into an oil discharge channel 45 of the filter base 10, in which also terminates the housing bore 28. The upper end of the tubular member 43 through which the bolt 23 extends with radial play, is in open communication with the filter chamber 39. The oil discharge channel 45 finally is additionally in free communication with a base channel 47 (FIG. 2) connected to a second filter base connection 46 so that the filtered- or clean-oil of the main flow filter insert 14 leaves the filter by way of the vertical tubular member 43 (FIG. 1), the base channel 47 (FIG. 2) and the filter base connection 46 (FIG. 2). A further oil discharge channel 49 (FIG. 1), which terminates in the base bore 28, starts from an auxiliary chamber 48 of the filter base 10, which auxiliary chamber 48 is in open communication in a manner not shown in the drawing with the filter chamber 36 carrying the dirty oil. Both oil discharge channels 45 and 49 are closed off by the lower end 26 of the bolt 23—whereas in contrast thereto, they are connected with the filter base connection 31 by way of the base channel 30 after the removal of the bolt 23. The filter base connection 31 remains in continuous connection with the oil pan or sump of the internal combustion engine during the exchange of the filter cartridge 13 so that upon removal of the cover 18, during which the lower end 26 of the bolt 23 necessarily leaves the base bore 28, the lubricating-oil which has collected in the filter pot 11 is necessarily drained off into the oil sump by way of the two oil discharge channels 45 and 49.

The dirty oil is supplied by way of a further filter base connection 50 (FIGS. 1 and 2) in the filter base 10. This base connection 50 may be sealed by a bolt 65 biased by a spring 66 across the base channel 47 (FIG. 2). A thermostatic valve 52 (FIG. 1) which operates in a valve bore 51 of the filter base 10, is connected with the filter base connection 50 and conducts the dirty oil flow at low lubricating temperatures directly into the filter chamber 36 whereas at higher lubricant temperatures, it conducts the dirty oil flow into a further filter base connections 53 of the filter base 10. Whereas the filter base connection 53 serves for the connection with a cooler inlet line of a lubricating oil cooler (not shown), the filter chamber 36 may be connected by way of a filter pot connection 54 (FIG. 1) of the filter pot 11 with the cooler return line of the lubricating oil cooler.

In order to prevent the escape of dirty oil out of the oil discharge channel 49 by way of the sliding fit or slide seat 29 into the base channel 30 carrying the finely filtered clean oil, the sliding seat 29 is provided with a sealing arrangement 55 which is so inserted into the lower end 26 of the bolt 23 that the discharge orifice 56 of the oil discharge channel 49 which is located in the base bore 28, is sealed off with respect to the discharge orifice 57 of the base bore 28 which is located in the base channel 30.

A further sealing arrangement 58 of the slide seat 29 is so inserted into the lower end 26 of the bolt 23 that the discharge orifice 56 of the oil discharge channel 49 which is under the higher pressure of the dirty oil is sealed off with respect to the discharge orifice 59 of the base bore 28 which is located in the oil discharge channel 45 that is under the lower pressure of the filtered oil.

In the embodiment according to FIG. 3, the sealing arrangement 55 which is effectively interconnected between the discharge orifices 56 and 57 is located at a reduced section 60 of the sliding seat 29 in order to protect during the insertion of the lower end 26 of the bolt 23 into the base bore 28, the sealing arrangement 55 against damages when passing over the discharge orifice 59 of the base bore 28 and the edges thereof.

While I have shown and described two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A lubricating-oil filter comprising:
   a. a filter base having a bore therein;
   b. a filter pot arranged generally upright at the filter base, said filter pot having a large inner space;
   c. a bolt retained at its lower end in the bore in the filter base and arranged centrally in the inner space of the filter pot;
   d. a first upper clean oil filter chamber centered around the bolt in the inner space of the filter pot;
   e. a second lower clean oil filter chamber centered around the bolt in the inner space of the filter pot;
   f. a first base channel means in the filter base for receiving oil emptied by way of the bore from the inner space of the filter pot from the first clean oil filter chamber, and from the second clean oil filter chamber;
   g. an intermediate channel means in the bolt for connecting the first clean oil filter chamber with the first base channel means;
   h. a first oil discharge channel means in the filter base for connecting the second clean oil filter chamber by way of the bore in the filter base with the first base channel means;
   i. a second base channel means for receiving oil emptied from the second clean oil filter chamber by way of the first oil discharge channel;
   j. a second oil discharge channel means in the filter base for connecting the inner space of the filter pot by way of the bore in the filter base with the first base channel means;
   whereby, upon removal of the lower end of the bolt from the bore in the filter base, oil is emptied from the inner space of the filter pot through the first and second oil discharge channels by way of the bore in the filter base into the first base channel means.

2. A lubricating-oil filter according to claim 1, further comprising a slide seat being arranged at the lower end of the bolt and including first means for sealing the bore in the filter base in order to prevent any oil in the second clean oil filter chamber and in the inner space of the filter pot from emptying by way of the bore in the filter base into the first base channel means.

3. A lubricating-oil filter according to claim 2, characterized in that the slide seat further includes a reduced section located within the area of the first and second oil discharge channel means.

4. A lubricating-oil filter according to claim 3, characterized in that the first and second oil discharge channel means each have discharge orifices that are offset in the direction of the longitudinal axis of the bolt with respect to one another.

5. A lubricating-oil filter according to claim 4, characterized in that the slide seat is sealingly interconnected between the discharge orifices of the first and second oil discharge channel means located in the reduced section of the slide seat.

6. A lubricating-oil filter according to claim 1, further comprising a cover for the filter pot; means for fastening the cover to the filter pot, said fastening means being separated structurally from the bolt; and support means for mounting the upper end of the bolt at the bottom side of the cover; whereby, upon fastening of the cover to the filter pot, the bolt is relieved of fastening forces and deformation of the cover is avoided.

7. A lubricating-oil filter according to claim 1, further comprising a filter cartridge arranged in the filter pot and adapted to be inserted into the filter pot by way of an upper opening in the filter pot.

8. A lubricating-oil filter according to claim 1, characterized in that the first and second oil discharge channel means each have discharge orifices that are offset in the direction of the longitudinal axis of the bolt with respect to one another.

9. A lubricating-oil filter according to claim 8, characterized in that the slide seat includes second means for sealing the bore in the filter base, said second means being sealingly interconnected between the discharge orifices of the first and second oil discharge channel means located in the bore in the filter base.

10. A filter according to claim 6, characterized in that the fastening means of the cover are arranged at the cover edge.

11. A filter according to claim 10, characterized in that the fastening means of the cover are arranged at a cover flange disposed along the cover edge.

12. A filter according to claim 10, characterized in that the upper end of the bolt is inserted substantially immovably into an aperture at the bottom side of the cover.

13. A filter according to claim 6, characterized in that the upper end of the bolt is inserted substantially immovably into an aperture at the bottom side of the cover.

* * * * *